(12) United States Patent
Seevers et al.

(10) Patent No.: US 11,248,689 B2
(45) Date of Patent: Feb. 15, 2022

(54) ACTUATOR WITH A SPINDLE DRIVE AND REAR-AXLE STEERING SYSTEM

(71) Applicant: ZF Friedrichshafen AG, Friedrichshafen (DE)

(72) Inventors: Gerrit Seevers, Stuhr (DE); Miguel De Carvalho, Quernheim (DE); Lars-Theodor Thole, Lohne (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 120 days.

(21) Appl. No.: 16/614,814

(22) PCT Filed: May 8, 2018

(86) PCT No.: PCT/EP2018/061742
§ 371 (c)(1),
(2) Date: Nov. 19, 2019

(87) PCT Pub. No.: WO2018/224229
PCT Pub. Date: Dec. 13, 2018

(65) Prior Publication Data
US 2020/0200242 A1    Jun. 25, 2020

(30) Foreign Application Priority Data
Jun. 8, 2017   (DE) .................. 10 2017 209 683.7

(51) Int. Cl.
*F16H 55/18*   (2006.01)
*F16H 25/20*   (2006.01)
(Continued)

(52) U.S. Cl.
CPC ....... *F16H 25/2006* (2013.01); *B62D 5/0445* (2013.01); *B62D 7/146* (2013.01); *F16H 2025/2096* (2013.01)

(58) Field of Classification Search
CPC ............. F16H 25/2003; F16H 25/2006; F16H 25/2009; F16H 2025/2012; B62D 5/0445
See application file for complete search history.

(56) References Cited

U.S. PATENT DOCUMENTS

RE31,713 E  * 10/1984  Erikson ............... F16H 25/2006
                                                      74/441
5,083,626 A    1/1992  Abe et al.
(Continued)

FOREIGN PATENT DOCUMENTS

DE    35 02 582 A1    8/1986
DE    695 09 1 25 T2   8/1999
(Continued)

OTHER PUBLICATIONS

German Search Report Corresponding to 10 2017 209 683.7 dated Feb. 16, 2018.
(Continued)

*Primary Examiner* — Jake Cook
(74) *Attorney, Agent, or Firm* — Finch & Maloney, PLLC; Michael Bujold; Jay Franklin

(57) ABSTRACT

Actuator having a spindle drive (1) for a rear wheel steering system, including a spindle (2) with a spindle thread (2a) and a spindle nut (3) with a nut thread (3a). The spindle thread (2a) and the nut thread (3a) are designed as displacement threads and the spindle nut (3) threadedly engages with the axially displaceable spindle (2) by way of the displacement thread. The spindle thread (2a) and the nut thread (3a) are braced against one another, in the longitudinal direction of the spindle (2), by a bracing element (4). The bracing element (4) is in the form of a threaded ring having an internal thread (4a) which engages with the spindle thread (2a). The threaded ring (4) is supported relative to the
(Continued)

spindle nut (3) by at least one spring element (5, 6), and the at least one spring element (5, 6) is made of an elastomer.

9 Claims, 1 Drawing Sheet

(51) Int. Cl.
    *B62D 5/04*     (2006.01)
    *B62D 7/14*     (2006.01)

(56) References Cited

U.S. PATENT DOCUMENTS

| | | |
|---|---|---|
| 5,252,015 A | 10/1993 | Davis |
| 5,732,596 A | 3/1998 | Erikson et al. |
| 5,913,940 A | 6/1999 | Erikson et al. |
| 6,041,671 A | 3/2000 | Erikson et al. |
| 6,131,478 A * | 10/2000 | Erikson ............... F16H 25/2006 74/441 |
| 2004/0250637 A1 | 12/2004 | Hosokai et al. |

FOREIGN PATENT DOCUMENTS

| | | |
|---|---|---|
| DE | 698 05 970 T2 | 11/2002 |
| DE | 669 03 426 T2 | 6/2003 |
| DE | 10 2015 219 198 A1 | 4/2017 |
| DE | 10 2015 224 775 A1 | 6/2017 |
| FR | 2 605 280 A1 | 4/1988 |
| WO | 99/63248 A1 | 12/1999 |

OTHER PUBLICATIONS

International Search Report Corresponding to PCT/EP2018/061742 dated Aug. 24, 2018.
Written Opinion Corresponding to PCT/EP2018/061742 dated Aug. 24, 2018.

* cited by examiner

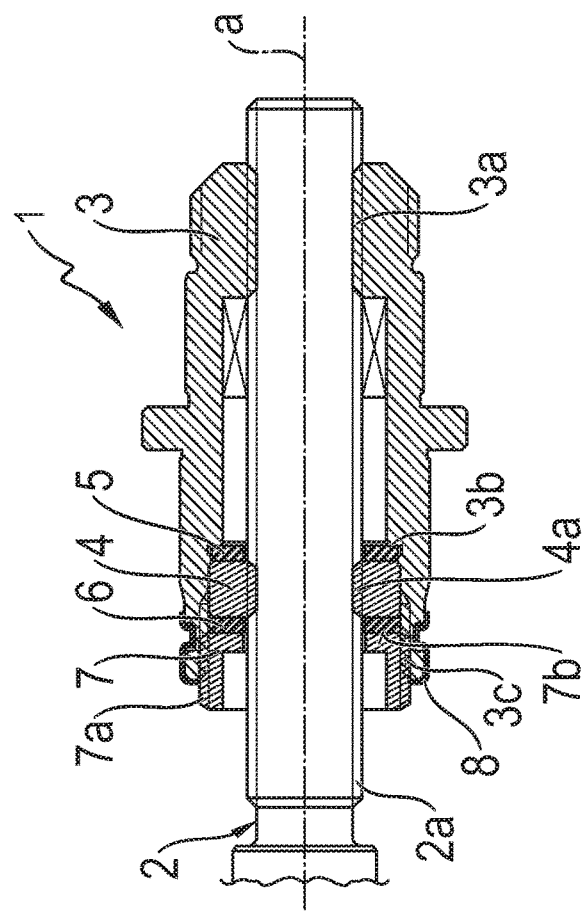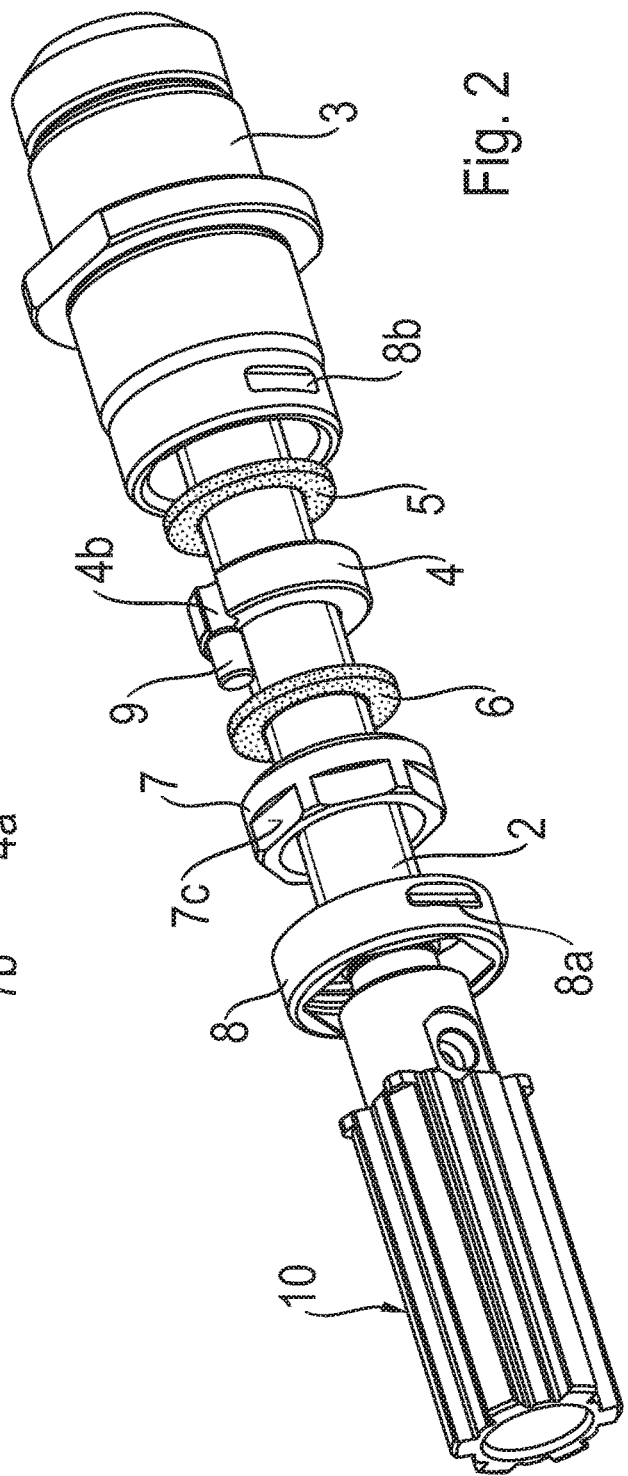

ACTUATOR WITH A SPINDLE DRIVE AND REAR-AXLE STEERING SYSTEM

This application is a National Stage completion of PCT/EP2018/061742 filed May 8, 2018, which claims priority from German patent application serial no. 10 2017 209 683.7 filed Jun. 8, 2017.

FIELD OF THE INVENTION

The invention relates to an actuator with a spindle drive that comprises a spindle with a spindle thread and a spindle nut with a female thread, and a rear axle steering system.

BACKGROUND OF THE INVENTION

In the older application DE 10 2015 224 775.9 a spindle drive is disclosed, in which the spindle thread and the nut thread are braced against one another in the longitudinal direction by a bracing element in the form of a loose nut, wherein the loose nut, also called a threaded ring, is supported against the spindle nut by a spring element in the form of a disk spring. By virtue of the disk spring a continuous prestress is produced, which results in mutual contact between the flanks of the spindle thread and the nut thread, thereby eliminating any axial play.

SUMMARY OF THE INVENTION

The purpose of the present invention is to improve a spindle drive of the above type and to provide a rear axle steering system that uses such a spindle drive.

The invention comprises the features of the independent claims. Advantageous design features emerge from the subordinate claims.

According to the independent claim(s) it is provided that the at least one spring element consists of an elastomer such as a plastic with elastic properties. The elastomer can be deformed elastically and, on being deformed, exerts an elastic restoring force or prestress. A spring element made of an elastomer, also called an elastomeric spring element, can be produced inexpensively and has weight advantages compared with a metallic spring element. Thus, with the elastomeric spring element a continuous prestress can be exerted on the threaded ring and hence on the flanks of the displacement threads. A possible axial play between the spindle nut and the spindle is eliminated.

According to a preferred embodiment the spring element is in the form of an elastomer disk, i.e. a disk made of an elastomeric material. The at least one elastomeric disk, which in radial cross-section is about the same size as the threaded ring, in other words having approximately the same end area, is arranged between the threaded ring and the spindle nut.

According to a further preferred embodiment the threaded ring is arranged so that it can slide axially in the spindle nut but is rotationally fixed relative to the spindle nut. Thus the threaded ring is synchronized with the spindle nut. An entraining connection between the threaded ring and the spindle nut can preferably be made by a cylindrical pin arranged at the circumference of the threaded ring, which at the same time engages in the spindle nut.

In a further preferred embodiment the spindle nut has an axial abutment, preferably in the form of a collar. The threaded ring and the at least one elastomer disk are braced against the abutment by means of an adjustment ring, with the effect that the at least one elastomer disk is deformed and therefore produces a prestress in the axial direction. Preferably, two elastomer disks are provided, one on either side of the threaded ring, with the first elastomer disk in contact with the abutment and the second elastomer disk in contact with the adjustment ring.

According to another preferred embodiment, the adjustment ring has an external thread and the spindle nut an internal thread, into which the adjustment ring with its external thread can be screwed. In that way the desired prestress in the axial direction can be continuously adjusted.

In a further preferred embodiment the adjustment ring is secured against working loose by a securing element. This brings the advantage that the set prestress is maintained during operation.

According to a further preferred embodiment, the securing element is in the form of a deformable ring, for example a sheet-metal ring, which on one side engages with interlock in the adjustment ring and on the other side engages with interlock in the circumference of the spindle nut. The deformable ring, also called the locking ring, is thus pushed over the adjustment ring and the end of the spindle nut and is then deformed to produce an interlock, for example crimped onto the spindle nut.

According to another preferred embodiment a wiper-seal element is fixed to the adjustment ring, which latter preferably has an L-shaped cross-section, the wiper-seal element engaging in the spindle nut. In that way the grease space inside the spindle nut can be sealed, i.e. the escape of lubricant is prevented.

The invention also relates to a rear axle steering system having an actuator and a spindle drive according to any of the preceding claims.

BRIEF DESCRIPTION OF THE DRAWINGS

An example embodiment of the invention is illustrated in the drawing and will be described in greater detail below, whereby from the description and/or the drawing further features and/or advantages may emerge. The drawing shows:

FIG. 1: A spindle drive with its spindle, spindle nut and threaded ring, and

FIG. 2: An exploded view of the spindle drive with its individual components.

DETAILED DESCRIPTION OF THE PREFERRED EMBODIMENTS

FIG. 1 shows a spindle drive 1, which comprises a spindle 2 with a spindle thread 2a and a spindle nut 3 with a nut thread 3a. The spindle drive 1 is a component of an actuator (not shown) such as that disclosed in the older application with file number 10 2015 224 775.9 mentioned earlier (see FIG. 3 therein and the associated description). The older application is fully incorporated in the disclosure content of the present application. The spindle nut 3, which is fitted in a housing (not shown) and can be driven in the rotational direction, is engaged via the nut thread 3a with the spindle thread 2a and brings about an axial displacement of the spindle 2, which—also not shown—is prevented from rotating. Between the flanks of the spindle thread 2a and the nut thread 3a, which are preferably in the form of trapezoid threads, there is some axial play resulting from the production process, which should be eliminated or at least minimized by the invention. For this a threaded ring 4 is provided, which has an internal thread 4a that engages with the spindle thread 2a. The threaded ring 4 is arranged and able to slide in a bore (not indexed) of the spindle nut 3 and—as shown in FIG. 2—is coupled with the spindle nut 3 in the rotational direction. On each side of the threaded ring 4 there are arranged, respectively, a first elastomer disk 5 and a second elastomer disk 6. The elastomer disks 5, 6 are disks that consist of an elastomeric material, for example rubber, and can be deformed in the axial direction, i.e. in the direction of the axis a of the spindle. In the area of the first elastomer disk 5 the spindle nut 3 has an axial abutment 3b in the form of a collar 3b against which the first elastomer disk 5 rests. Into the spindle nut 3, which at the end has an internal thread 3c, is screwed an adjustment ring 7 which has an external thread 7a. The adjustment ring 7 has a flat surface 7b which rests against the second of the elastomer disks 6. By screwing the adjustment ring 7 into the spindle nut 3 the first and second elastomer disks 5, 6 are deformed in the axial direction and hence elastically braced. Thus, the threaded ring 4 is acted upon in both axial directions by the prestress that results from the deformation of the two elastomer disks 5, 6. This ensures contact and prestressing of the flanks of the spindle thread 2a and the nut thread 3a, which eliminates the axial play. The adjustment ring 7 is secured against working loose by a securing element 8 in the form of a deformable ring 8. The ring 8 engages with interlock in the adjustment ring 7 (as can be seen more clearly in FIG. 2) on one side, and on the other side in an entraining surface (which is not indexed in FIG. 1) of the spindle nut 3.

FIG. 2 shows an exploded view of the spindle drive 1, wherein the same indexes as in FIG. 1 have been used for the same components. The spindle 2, which can be screwed with its end into the spindle nut 3, has at its other end a splined profile 10 which serves as a thrust bearing and anti-rotation securing means relative to an actuator housing (not shown). The threaded ring 4, which at its circumference has a half-cylinder-shaped recess 4b, is secured against rotation relative to the spindle nut 3 by a cylindrical pin 9, wherein the cylindrical pin 9 engages in a corresponding recess (not shown) in the spindle nut 3. At its circumference the adjustment ring 7 has hexagonal surfaces 7c onto which an appropriate tool can be fitted in order to turn the adjustment ring 7. The deformable ring 8, also called the locking ring 8, has at its circumference a stamped projection 8a which engages in a corresponding recess 8b at the circumference of the spindle nut 3. Thus, the locking ring 8 is secured against rotation relative to the spindle nut 3 by partial deformation at the circumference, known as crimping. In addition (but not shown), the locking ring 8 can also serve as a carrier for a wiper-seal element that prevents the escape of lubricant from the free space in the spindle nut 3.

INDEXES

1 Spindle drive
2 Spindle
2a Spindle thread
3 Spindle nut
3a Nut thread
3b Axial abutment
3c Internal thread
4 Threaded ring
4a Internal thread
4b Recess
5 First elastomer disk
6 Second elastomer disk
7 Adjustment ring
7a External thread
7b Flat surface
7c Hexagonal surfaces
8 Securing element
8a Stamped projection
8b Recess
9 Cylindrical pin
10 Splined profile
a Spindle axis

The invention claimed is:

1. An actuator having a spindle drive for a rear wheel steering system, comprising:
a spindle with a spindle thread,
a spindle nut with a nut thread,
the spindle thread and the nut thread being displacement threads,
the spindle nut being drivable in a rotational direction and engaging with the spindle by way of the displacement threads such that rotation of the spindle nut axially displaces the spindle,
the spindle thread and the nut thread being braced against one another in a longitudinal direction of the spindle by a bracing element,
the bracing element being in a form of a threaded ring having an internal thread which engages with the spindle thread,
the threaded ring being supported relative to the spindle nut (3) by at least one spring element,
the at least one spring element being made of an elastomer, and
the threaded ring is fitted such that the threaded ring is axially slidable within the spindle nut but is rotationally fixed relative to the spindle nut.

2. The actuator according to claim 1, wherein the at least one spring element is in a form of an elastomer disk which is arranged between the spindle nut and the threaded ring.

3. The actuator according to claim 1, wherein the spindle nut has an axial abutment and the threaded ring and the at least one elastomer disk are braceable against the abutment by an adjustment ring.

4. The actuator according to claim 3, wherein the adjustment ring has an external thread and the spindle nut has an internal thread, into which the adjustment ring can be screwed.

5. The actuator according to claim 4, wherein a securing element secures the adjustment ring from working loose.

6. The actuator according to claim 5, wherein the securing element is a deformable ring which interlockably engages with the adjustment ring and interlockably engages with a circumference of the spindle nut.

7. The actuator according to claim 6, wherein a wiper-seal element is attached onto the deformable ring and engages in the spindle thread.

8. A rear axle steering system having an actuator and a spindle drive having a spindle with a spindle thread and a spindle nut with a nut thread,
the spindle thread and the nut thread being displacement threads,
the spindle nut being drivable in a rotational direction and engaging with the spindle by way of the displacement threads such that rotation of the spindle nut axially displaces the spindle,
the spindle thread and the nut thread being braced against one another in a longitudinal direction of the spindle by a bracing element,
the bracing element being in a form of a threaded ring having an internal thread which engages with the spindle thread, the threaded ring being supported relative to the spindle nut (3) by at least one spring element, the at least one spring element being made of an elastomer, and the threaded ring is fitted such that the threaded ring is axially slidable within the spindle nut but is rotationally fixed relative to the spindle nut.

9. An actuator having a spindle drive for a rear wheel steering system, the actuator comprising:

a spindle defining a longitudinal axis and having an exterior spindle thread, and the spindle being rotationally fixed relative to the longitudinal axis;

a spindle nut having an interior nut thread, and the spindle nut being axially fixed along the longitudinal axis, the spindle thread and the nut thread threadably mating with one another such that rotation of the spindle nut, about the spindle, biases the spindle axially relative to the spindle nut;

a threaded ring having an internal thread threadably engaging with the spindle thread such that rotation of the threaded ring about the spindle axially biases the threaded ring along the spindle;

an elastomeric spring element being supported on the spindle, axially between the threaded ring and the spindle nut, the threaded ring being biased, by rotation thereof, in an axial direction toward the spindle nut such that one axial side of the spring element abuts the spindle nut and an opposite axial side of the spring element abuts the threaded ring;

the spring element applying a prestress force on the spindle thread and the nut thread such that the spindle and the spindle nut are axially braced against one another and axial play therebetween is eliminated, and the threaded ring is fitted such that the threaded ring is axially slidable within the spindle nut but is rotationally fixed relative to the spindle nut.

\* \* \* \* \*